(Model.)

J. G. EWING.
COFFEE AND TEA POT.

No. 244,212. Patented July 12, 1881.

Witnesses
James T. Hoblit
Hiram L. Pince

Inventor:
Joseph G. Ewing

UNITED STATES PATENT OFFICE.

JOSEPH G. EWING, OF LINCOLN, ILLINOIS.

COFFEE AND TEA POT.

SPECIFICATION forming part of Letters Patent No. 244,212, dated July 12, 1881.

Application filed April 27, 1881. (Model.)

*To all whom it may concern:*

Be it known that I, JOSEPH G. EWING, of Lincoln, in the county of Logan and State of Illinois, have invented a new and useful Improvement in the Construction of Coffee and Tea Pots, which improvement I style " The Eureka Coffee and Tea Pot," and of which the following is a specification, reference being had to the accompanying drawings, forming part of the specification.

The vessel is constructed with an outer and inner apartment, the outer one to contain water only, the inner one to contain the coffee or tea and the water necessary to extract its essence and prepare it for the table.

Figure 1:
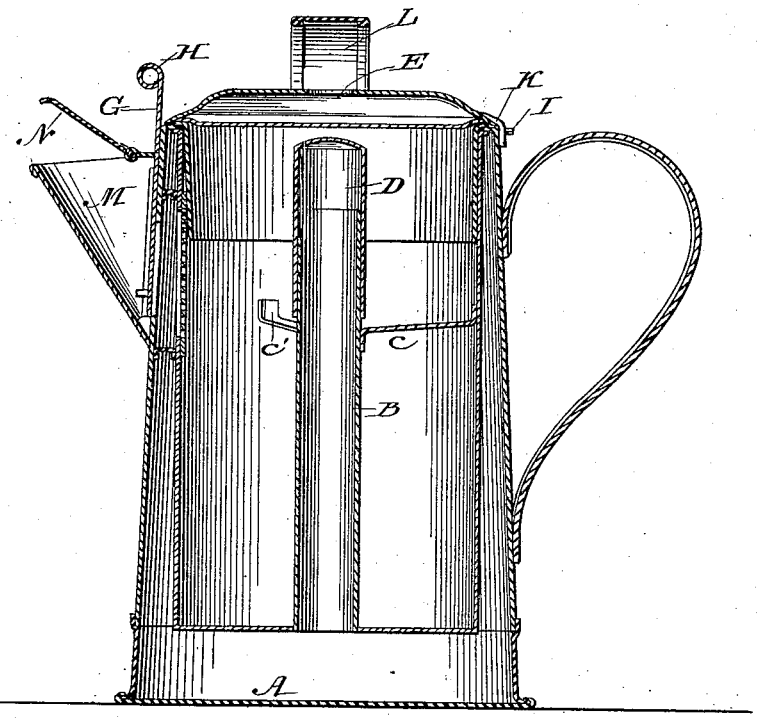

Figure 1 in the drawings represents a vertical central section of my coffee-pot on a plane passing through the handle and spout. A represents the bottom of the vessel, composed of copper, with a rim of the same material extending upward three-fourths of an inch or more, on which no soldering is used, except that the upper edge of said copper rim is attached to the lower edge of the tin or other material used by inside soldering, said copper bottom and the tin or other material attached thereto forming the outer portion of said pot.

Figure 2:
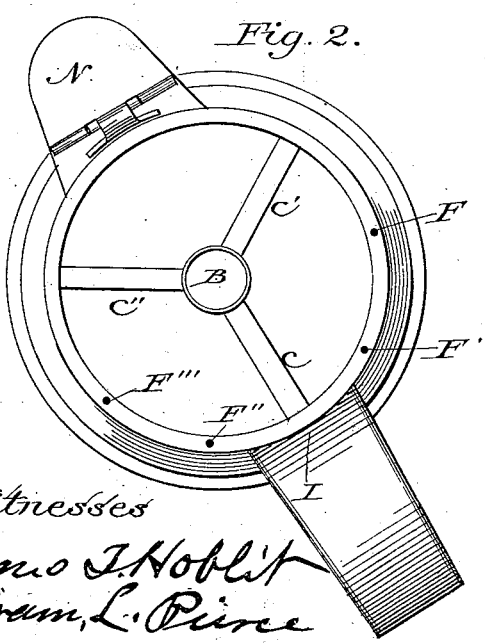

Fig. 2 represents a top view of the apparatus, the top of the pot being removed. In the center of the inner apartment, from the bottom to within about an inch of the top of the pot, is a tube, the lower end opening into the space between the two apartments, and soldered to the bottom of the inner, (represented by B,) and kept in position by arms or braces, lettered $c\ c'\ c''$, extending from said tube to the walls of the pot. The top of said tube is closed by a cap, D, closely fitting over it.

Figure 3:
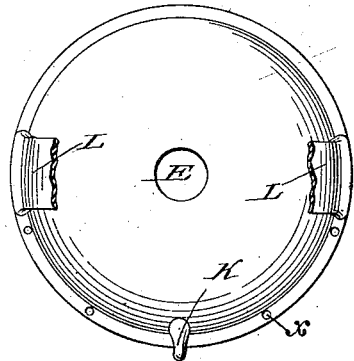

Fig. 3 represents a top view of the lid of the vessel, which closely fits into its top in the usual manner. This lid is also double, with a space between the two plates thereof, the upper plate perforated in the center, at E, for the purpose of admitting cold air, the object of which is to keep the lower plate of said lid colder than the steam that strikes it, and thus condense the steam.

The outer and inner walls of the pot are so constructed as to approach each other, and at the top the space between them is very narrow, the tops of both being attached by the upper edge of one wall being lapped across the space to the other, to which it is secured with solder, and above the narrow space between them are perforated four or more small holes, lettered $F\ F'\ F''\ F'''$, for the purpose of permitting the escape of steam that will be generated in the space between the two parts of the vessel; and in the rim of the pot-lid, Fig. 3, are four or more perforations, $x$, corresponding with them, and made necessary because when said steam will be generated the lid will be in place on the pot.

The purpose of the tube B is that the space between the two walls of the pot may be filled through it, and also to have through the center of the vessel containing the coffee, as well as around it, hot water and steam.

That portion of the inner wall of the pot that is surrounded by the spout is cut away, and around it the walls are soldered together. Covering the aperture is a perforated plate, soldered to the pot, and opposite an aperture through the outer wall, to admit the passage of the coffee or tea through the spout; and in front of these perforations is a sliding valve, G, which, by being raised or lowered, opens or closes said perforations. Said valve is raised by a handle, H, attached thereto, and lowered by pressing upon said handle.

At the upper and outer edge of the pot, and over the center of the handle, is a small horizontal projection, I, and upon the rim of the pot-lid is a similar projection, K, curved downward, and so placed that the two coming and remaining in contact will keep the lid, Fig. 3, in proper position to cause the perforations $x$ in the rim of the lid to register with the perforations $F, F', F''$, and $F'''$ while the water is boiling.

L represents the handle of the vessel-top; M, the spout, and N the lid of the spout, which may be opened or closed, as desired.

To make coffee or tea in this vessel, first put into the inner apartment the quantity of coffee or tea desired; then remove the cap from tube B and pour into the vessel a proper quantity of water through said tube, filling the space in the outer apartment to such an extent that the water will nearly reach the top of the tube; then close the tube and continue to fill the inner apartment with water to the extent desired. The sliding valve G will close the perforations in the spout while the water is boiling. When the coffee or tea is to be served, raise the valve, pour it out, and then press the valve down to retain the aroma. When the pot is removed from the fire, slightly turn the lid, so as to prevent any escape of steam through the perforations F F' F'' F'''.

What I claim as new, and desire to secure by Letters Patent, is—

1. The horizontal projection I and curved projection K, in combination with perforations F F' F'' F''' and $x$, as and for the purposes set forth.

2. In a coffee or tea pot constructed to insure economy in the use of material and retain the aroma of the beverage, the tube B, perforations F F' F'' F''' and $x$, projections I and K, and valve G, all in combination, as and for the purposes stated.

JOSEPH G. EWING.

Witnesses:
 ROBERT HUMPHREY,
 A. B. ROBERTS.